United States Patent
Ma et al.

(10) Patent No.: US 7,623,886 B2
(45) Date of Patent: Nov. 24, 2009

(54) METHOD AND APPARATUS FOR TRANSMITTER CALIBRATION

(75) Inventors: Ssu-Pin Ma, San Jose, CA (US); Isaac Sever, Sunnyvale, CA (US)

(73) Assignee: NDSSI Holdings, LLC, San Jose, CA (US)

( * ) Notice: Subject to any disclaimer, the term of this patent is extended or adjusted under 35 U.S.C. 154(b) by 812 days.

(21) Appl. No.: 11/300,089

(22) Filed: Dec. 14, 2005

(65) Prior Publication Data

US 2007/0135058 A1    Jun. 14, 2007

(51) Int. Cl.
*H04B 7/00* (2006.01)
(52) U.S. Cl. .............. 455/522; 455/13.4; 455/574; 455/114.3; 455/127.1; 455/127.5; 455/186
(58) Field of Classification Search .......... 455/522, 455/13.4, 574, 114.3, 127.1, 127.5, 186, 455/196.1, 208, 209, 255
See application file for complete search history.

(56) References Cited

U.S. PATENT DOCUMENTS

| | | | |
|---|---|---|---|
| 5,524,275 A * | 6/1996 | Lindell .................. 455/117 |
| 6,097,336 A * | 8/2000 | Stilp ................... 342/357.02 |
| 6,320,540 B1 | 11/2001 | Meredith |
| 6,404,293 B1 * | 6/2002 | Darabi et al. ............... 331/37 |
| 6,417,737 B1 * | 7/2002 | Moloudi et al. ............ 330/301 |
| 6,608,527 B2 * | 8/2003 | Moloudi et al. ............ 330/301 |
| 6,738,601 B1 * | 5/2004 | Rofougaran et al. ....... 455/66.1 |
| 6,856,284 B1 | 2/2005 | Cangiani |
| 6,917,789 B1 * | 7/2005 | Moloudi et al. .............. 455/78 |
| 6,931,267 B2 * | 8/2005 | Darabi ..................... 455/574 |
| 6,961,546 B1 * | 11/2005 | Rofougaran et al. ........ 455/118 |
| 6,968,167 B1 * | 11/2005 | Wu et al. ................. 455/251.1 |
| 6,987,966 B1 * | 1/2006 | Wu et al. .................. 455/420 |
| 7,031,668 B2 * | 4/2006 | Darabi et al. ................ 455/75 |
| 7,082,293 B1 * | 7/2006 | Rofougaran et al. ........ 455/260 |
| 7,116,945 B2 * | 10/2006 | Moloudi et al. .............. 455/78 |
| 7,299,006 B1 * | 11/2007 | Rofougaran et al. ......... 455/20 |
| 7,356,310 B2 * | 4/2008 | Rofougaran et al. ....... 455/66.1 |
| 7,395,098 B2 * | 7/2008 | Darabi ..................... 455/574 |
| 7,428,426 B2 * | 9/2008 | Kiran et al. ................ 455/522 |
| 7,463,868 B2 * | 12/2008 | Rofougaran et al. ........ 455/118 |
| 2002/0081978 A1 * | 6/2002 | Hou et al. .................. 455/67.1 |
| 2002/0140869 A1 | 10/2002 | Carr |
| 2004/0166803 A1 * | 8/2004 | Moloudi et al. .............. 455/20 |
| 2004/0242275 A1 | 12/2004 | Corbett et al. |
| 2005/0059424 A1 | 3/2005 | Sahota |
| 2005/0130595 A1 | 6/2005 | Shurvinton |
| 2005/0181754 A1 * | 8/2005 | Wu et al. ................. 455/251.1 |

(Continued)

*Primary Examiner*—Minh D Dao
(74) *Attorney, Agent, or Firm*—Brian Short (57) ABSTRACT

A method and apparatus of calibrating a transmitter are disclosed. The method includes attenuating transmitter output signals as controlled by an output control signal, ensuring that an average power of the transmitter output signals is below a threshold level, and performing calibration of the transmitter at periods of time in which the output control signal is attenuating the transmitter output signals a lesser amount. The lesser amount can be less than an average of a minimum amount of attenuation and a maximum amount of attenuation. The apparatus includes a transmitter that includes a frequency up-converting LO mixer for frequency up-converting base band signals, generating transmitter output signals, a transmitter antenna for transmitting the transmitter output signals, and control circuitry for controlling attenuating the transmitter output signals during a calibration of the transmitter.

20 Claims, 7 Drawing Sheets

U.S. PATENT DOCUMENTS

| | | | |
|---|---|---|---|
| 2005/0186917 A1* | 8/2005 | Rofougaran et al. | 455/73 |
| 2005/0186930 A1 | 8/2005 | Rofougaran | |
| 2006/0003719 A1* | 1/2006 | Darabi | 455/251.1 |
| 2006/0063494 A1* | 3/2006 | Zhang et al. | 455/78 |
| 2006/0198128 A1* | 9/2006 | Piepgras et al. | 362/147 |
| 2007/0135058 A1* | 6/2007 | Ma et al. | 455/69 |
| 2008/0064344 A1* | 3/2008 | Kuo et al. | 455/118 |
| 2008/0069266 A1* | 3/2008 | Kuang | 375/295 |
| 2008/0223641 A1* | 9/2008 | Elson | 180/167 |
| 2008/0267270 A1* | 10/2008 | Darabi | 375/219 |
| 2008/0290966 A1* | 11/2008 | Darabi et al. | 333/167 |
| 2008/0311865 A1* | 12/2008 | Worfolk et al. | 455/115.1 |
| 2009/0010310 A1* | 1/2009 | Rofougaran et al. | 375/135 |

* cited by examiner

Attenuating transmitter output signals as controlled by an output control signal, ensuring that an average power of the transmitter output signals is below a threshold level

710

Performing calibration of the transmitter at periods of time in which the output control signal is attenuating the transmitter output signals a lesser amount

METHOD AND APPARATUS FOR TRANSMITTER CALIBRATION

FIELD OF THE INVENTION

The invention relates generally to communication systems. More particularly, the invention relates to a method and apparatus for transmitter calibration.

BACKGROUND OF THE INVENTION

Figure 1:
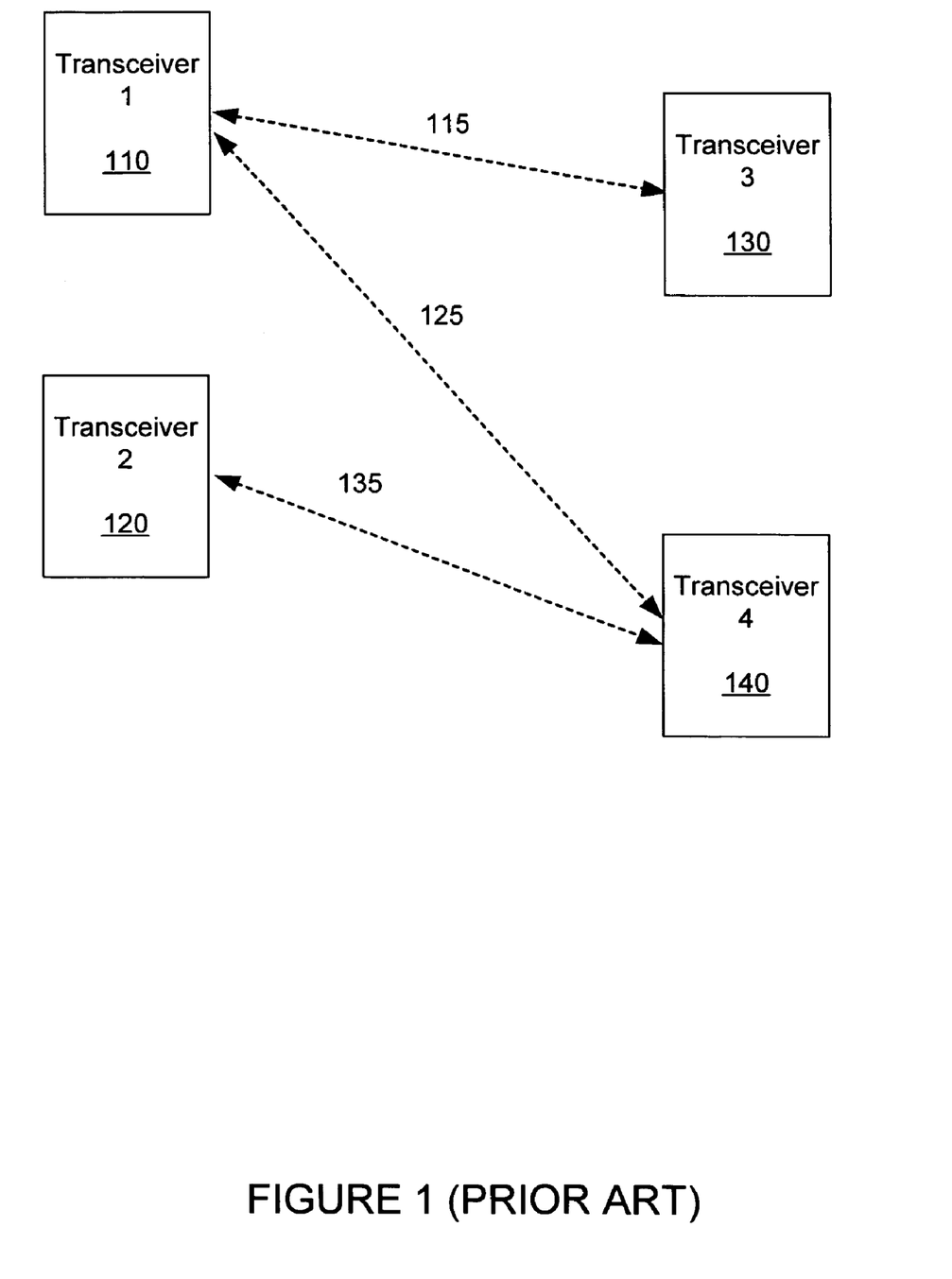
FIG. 1 shows a prior art UWB mesh network.

Ultra-wideband (UWB) modulation provides high data rate radio communications for transferring data using very wide modulation bandwidths. FIG. 1 shows a typical application of UWB communication links used for indoor wireless communications. Several transceivers, for example, transceivers 110, 120, 130, 140 are networked allowing high bandwidth communications between the transceivers 110, 120, 130, 140. The transceivers 110, 120, 130, 140 can include, for example, a high definition television (HDTV) monitor networked with other devices, such as, a digital video recorder (DVR), a digital video disk (DVD) player and a computing device.

The Federal Communications Committee (FCC) has mandated that UWB radio transmission can legally operate in the frequency range of 3.1 GHz to 10.6 GHz. The transmit power requirement for UWB communications is that the maximum average transmit Effective Isotropic Radiated Power (EIRP) is −41.25 dBm/MHz in any transmit direction. The bandwidth of each transmission channel is 528 MHz.

To provide optimal operating performance, transmitters and transceivers typically need to be calibrated. For example, transmitters typically suffer from transmitter local oscillator (LO) feed through which needs to be calibrated to minimize its effects, and in some cases, meet FCC requirements. Typical transmitter calibrations include an LO feed through calibration, an output power calibration and filter tuning calibrations.

It is desirable to perform the calibration while the transmitter is in a normal operating mode. That is, it is desirable that the transmission chain remain similar operationally as when it is transmitting, ensuring the calibration is accurate.

It is desirable have a method and apparatus for ensuring signal power of a transmitter does not exceed a threshold average power during calibration of the transmitter.

SUMMARY OF THE INVENTION

An embodiment of the invention includes a method of calibrating a transmitter. The method includes attenuating transmitter output signals as controlled by an output control signal, ensuring that an average power of the transmitter output signals is below a threshold level, and performing calibration of the transmitter at periods of time in which the output control signal is attenuating the transmitter output signals a lesser amount. The lesser amount can be an amount less than an average of a minimum amount of attenuation and a maximum amount of attenuation.

Another embodiment of the invention includes a transmitter. The transmitter includes a frequency up-converting LO mixer for frequency up-converting base band signals, generating transmitter output signals, a transmitter antenna for transmitting the transmitter output signals, and control circuitry for controlling attenuating the transmitter output signals during a calibration of the transmitter.

Other aspects and advantages of the present invention will become apparent from the following detailed description, taken in conjunction with the accompanying drawings, illustrating by way of example the principles of the invention.

DETAILED DESCRIPTION

The invention includes an apparatus and method for calibrating a transmitter. The calibration is performed while ensuring that average power emissions from the transmitter does not exceed a predetermined threshold.

It is to be appreciated that the present teaching is by way of example, not by limitation. Therefore, although the embodiments described herein are for convenience of explanation, it is to be appreciated that the principles herein may be applied equally to other configurations of transmitter calibration.

Figure 2:
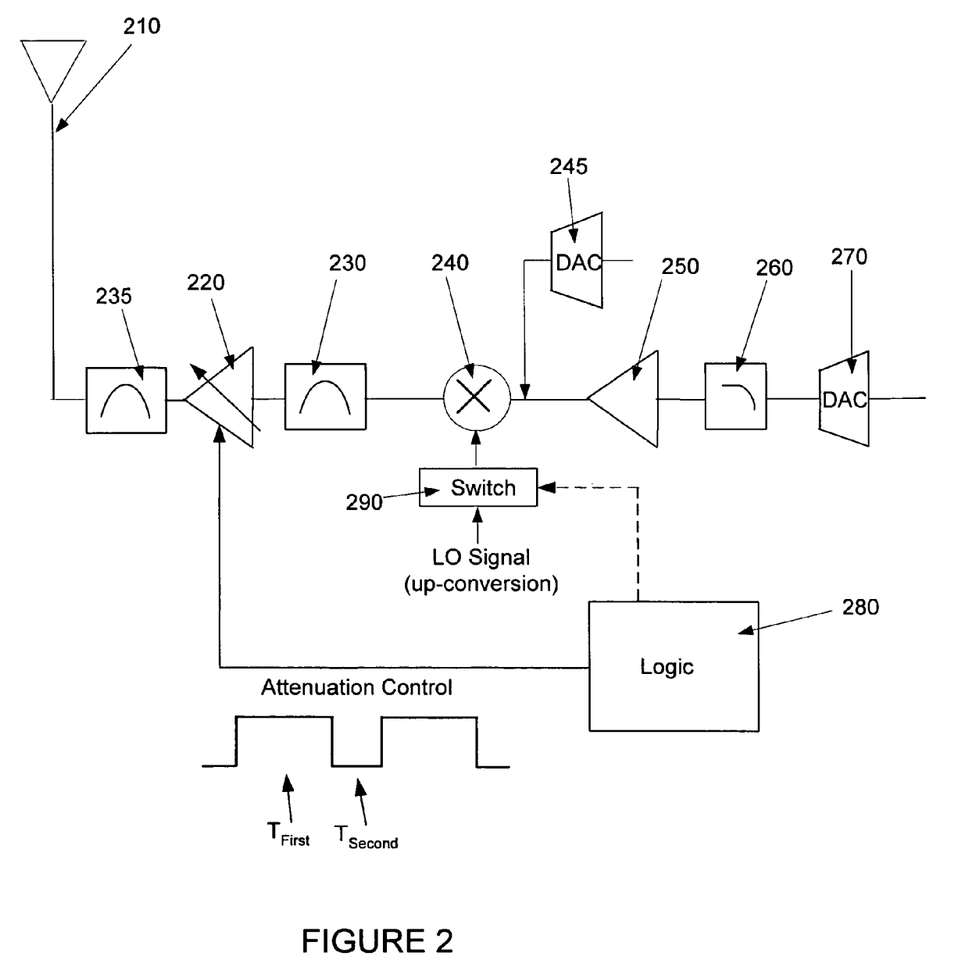
FIG. 2 shows an exemplary transmitter that includes attenuation control of transmitter output signals during calibration of the transmitter.

FIG. 2 shows an exemplary transmitter that includes attenuation control of transmitter output signals during calibration of the transmitter. The exemplary embodiment includes a DAC 270 that receives a digital signal stream for transmission. An analog output of the DAC 270 can be filtered by a filter 260 and amplified by an amplifier 250. Ultimately, the analog output of the DAC 270 is frequency up-converted by a frequency up-converting mixer 240. The up-converted analog signal can be filtered by filters 230, 235. As shown, the up-converted analog signal is attenuated as controlled by logic block 280. More specifically, the amplitude of the up-converted analog signal is attenuated by a variable gain amplifier 220 as controlled by a pulsed signal generated by the logic block 280. The up-converted analog signal is transmitted through antenna 210 after passing through the variable gain amplifier 220.

For an exemplary embodiment, the pulsed signal of the attenuation control includes first portions ($T_{First}$) and second portions ($T_{Second}$). Calibration of the transmitter occurs during first portions so that loading of the transmitter is approximately the same as when the transmitter is transmitting signals. This ensures accuracy of the calibration.

Several different methods (as will be discussed) can be used to ensure the logic 280 controls attenuation of transmit signals to ensure the average power transmitted from the transmitter is maintained below a predetermined threshold. The average power can be maintained by either adjusting the duty cycle of the pulsed control signal, adjusting the amplitude of the pulsed signal (and therefore, the amount of attenuation) or a combination of both duty cycle and amplitude control. The control of the adjustable attenuation can be either a digital or an analog signal. If the adjustable attenuation control is a digital signal, it can include any number of digital values.

The control signal of FIG. 2 is shown as a pulsed signal having the first and second portions in which the attenuation of the output signal is greater for the second portion than the first portion. However, all that is required of the control signal is that the output signals be attenuated, ensuring that an average power of the transmitter output signals is below a threshold level. That is, the control signal does not have to be a pulse signal. Any signal that satisfies the average power output threshold is acceptable. The control signal can be of any shape or form. The calibration is performed when the attenuation is near the same as when transmitting signals. This is typically with no attenuation, but this is not required. An embodiment includes the calibration being performed at periods of time in which the output control signal is attenuating the transmitter output signals a lesser amount. The lesser amount can be defined as less than an average of a minimum amount of attenuation and a maximum amount of attenuation.

The filters 230, 235, 260 can be included, but are not necessary for implementing the power controlled calibration processes. Additionally, other components shown in FIG. 2 can be implemented in other forms or configurations. A DAC 245 is included for performing an LO calibration. The calibration is performed at full power during the first portion $T_{First}$ of the pulsed control signal. The LO feed through is measured (as will be shown later) during the first portion, and the DAC 245 provides an adjustable D.C. signal for canceling the LO leakage feed through. During the first portion, the LO feed through is transmitted from the output of the transmitter. For wireless networks that have strict limitations on transmitted power, such as UWB networks, the transmitted LO feed through leakage can cause the transmitter output to exceed the transmission power limitations. The duty cycle and attenuation levels of the output signals as controlled by the pulsed control signal can be used to ensure the average threshold power levels are not exceeded.

FIG. 2 includes a variable gain amplifier 220 as controlled by a pulsed signal generated by the logic block 280. However, this is exemplary. That is, other methods can be used to attenuate the output signals. For example, as will be described later, a switch can be included at the output of the transmitter that either connects the output signals to the antenna, or disconnects the output signals from the antenna 210. Another configuration for attenuating the output signals includes attenuating the LO signal. A switch 290 can be used to provide attenuation control of the LO signal. The states of the switch 290 are controlled by the logic 280 to ensure the average power of output signals do not exceed the threshold. More generally, the output signals are attenuated by attenuating the LO signal that drives a frequency converter of the transmitter.

Figure 3:
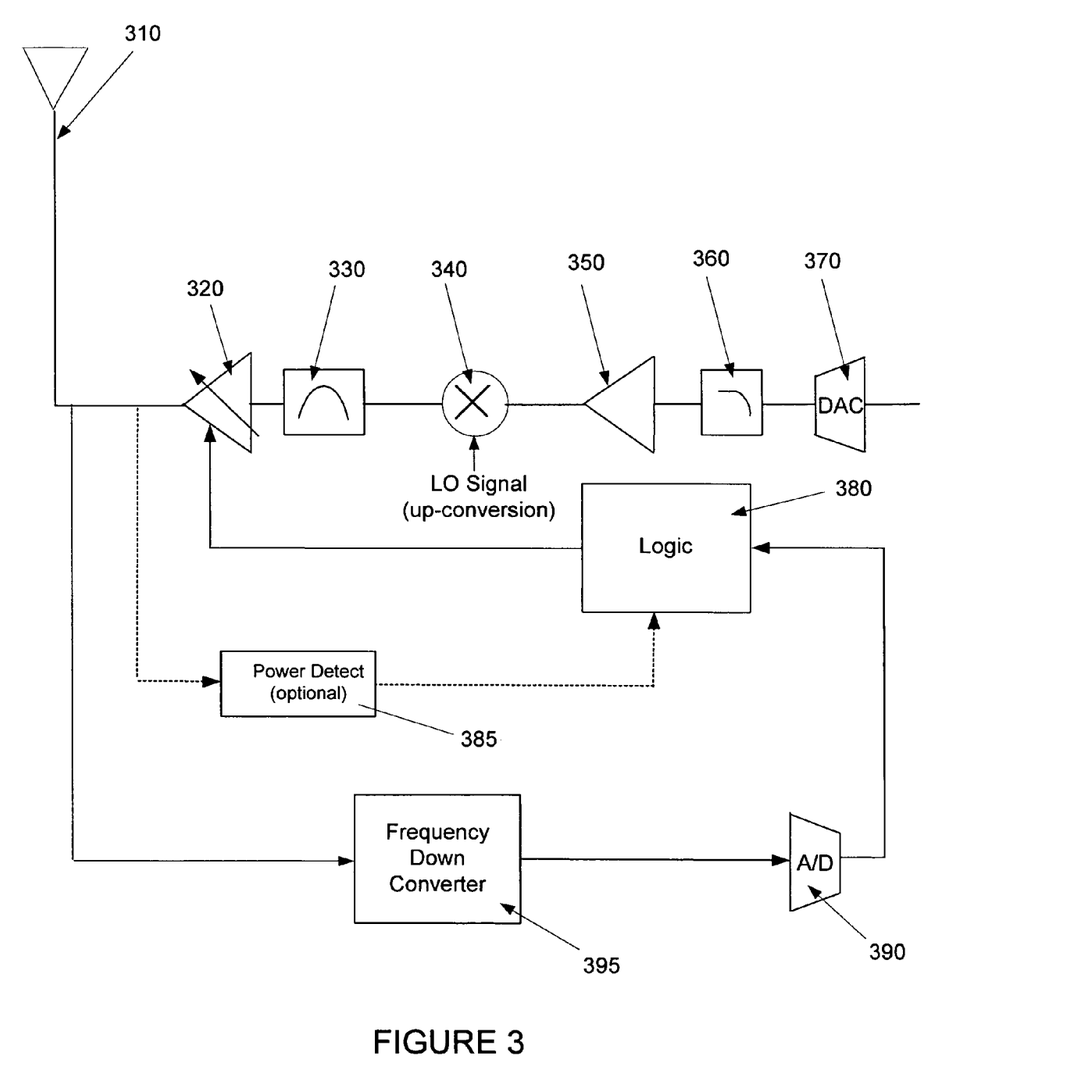
FIG. 3 shows an exemplary transmitter that includes attenuation control of transmitter output signals during calibration of the transmitter as determined by measurements of signal power out of the transmitter.

FIG. 3 shows an exemplary transmitter that includes attenuation control of output signals of the transmitter during calibration of the transmitter as determined by measurements of signal power out of the transmitter. The transmitter of FIG. 3 includes two exemplary methods for detecting the power of transmitted signals. The disclosed methods are not limiting. That is, other possible methods of detecting the power of the transmitted signals are possible.

A first method includes frequency down-converting (per frequency down-converter 395) a representative portion of the output signals, and sampling the frequency down-converted portion with an analog to digital converter (ADC) 390.

The output samples of the ADC 390 are used by the logic 380 to control the attenuation of the output signals. The frequency down-converter 395 and ADC 390 provide the logic 380 with a feedback path that allows the logic 380 to accurately control the average transmit power of the output signals of the transmitter. As will be described, the frequency down-converter 395 can be implemented with a corresponding receiver section of a transceiver that includes the transmitter.

A second method includes a power detector 385 that directly senses the power of the transmitted signals. The output of the power detector 385 can be sampled and input to the logic 380. Again, the power detector 385 provides the logic 380 with a feedback path that allows the logic 380 to accurately control the average transmit power of the output signals of the transmitter.

The transmitter elements 320, 330, 340, 350, 360, 370 provide the equivalent functionality as transmitter elements 220, 230, 240, 250, 260, 270 of FIG. 2.

Figure 4:
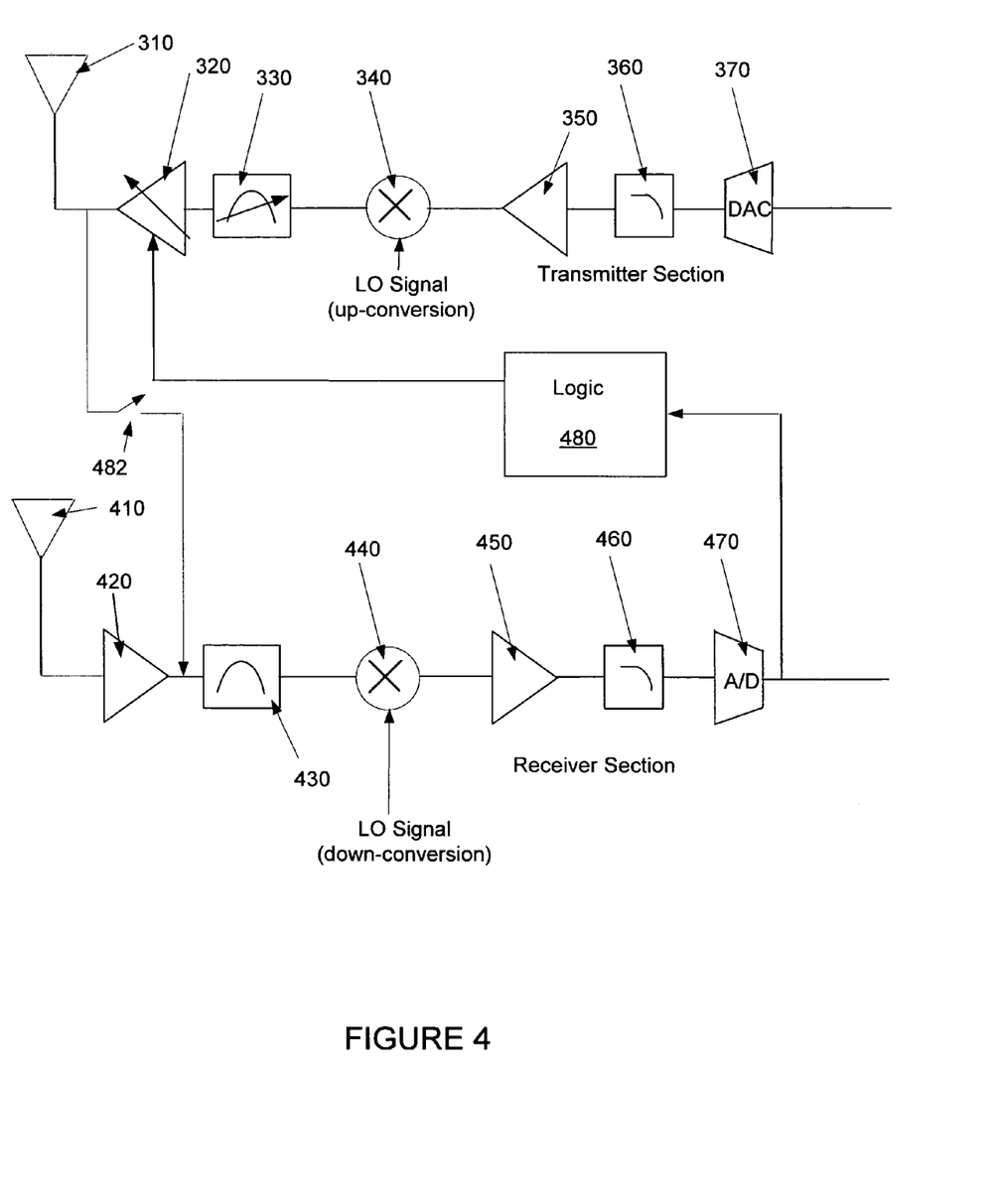
FIG. 4 shows an exemplary transmitter and receiver that include attenuation control of transmitter output signals during calibration of the transmitter as determined by measurements of signal power out of the transmitter by the receiver.

FIG. 4 shows an exemplary transmitter and receiver that include attenuation control of transmitter output signals during calibration of the transmitter as determined by measurements of transmit signal power out of the transmitter, by the receiver. The frequency down-converter of FIG. 3 has been implemented with a receiver section of a transceiver that includes the transmitter and the receiver. A switch 482 provides connection of the output signals to the receiver.

The receiver section includes an antenna 410, optional amplifiers 420, 450 and optional filters 430, 460. Signals either received through the antenna 410, or transmitter output signals looped back through the switch 482, are frequency down-converted by an LO signal. The frequency down-converter signal is sampled by an ADC 470. Digital samples of the ADC 470 are input to the logic 480 for aiding in generation of the output control signal of the logic 480. As previously described, the logic 480 controls attenuation of the output signal, by adjusting a level of attenuation of the variable amplifier 320.

Figure 5:
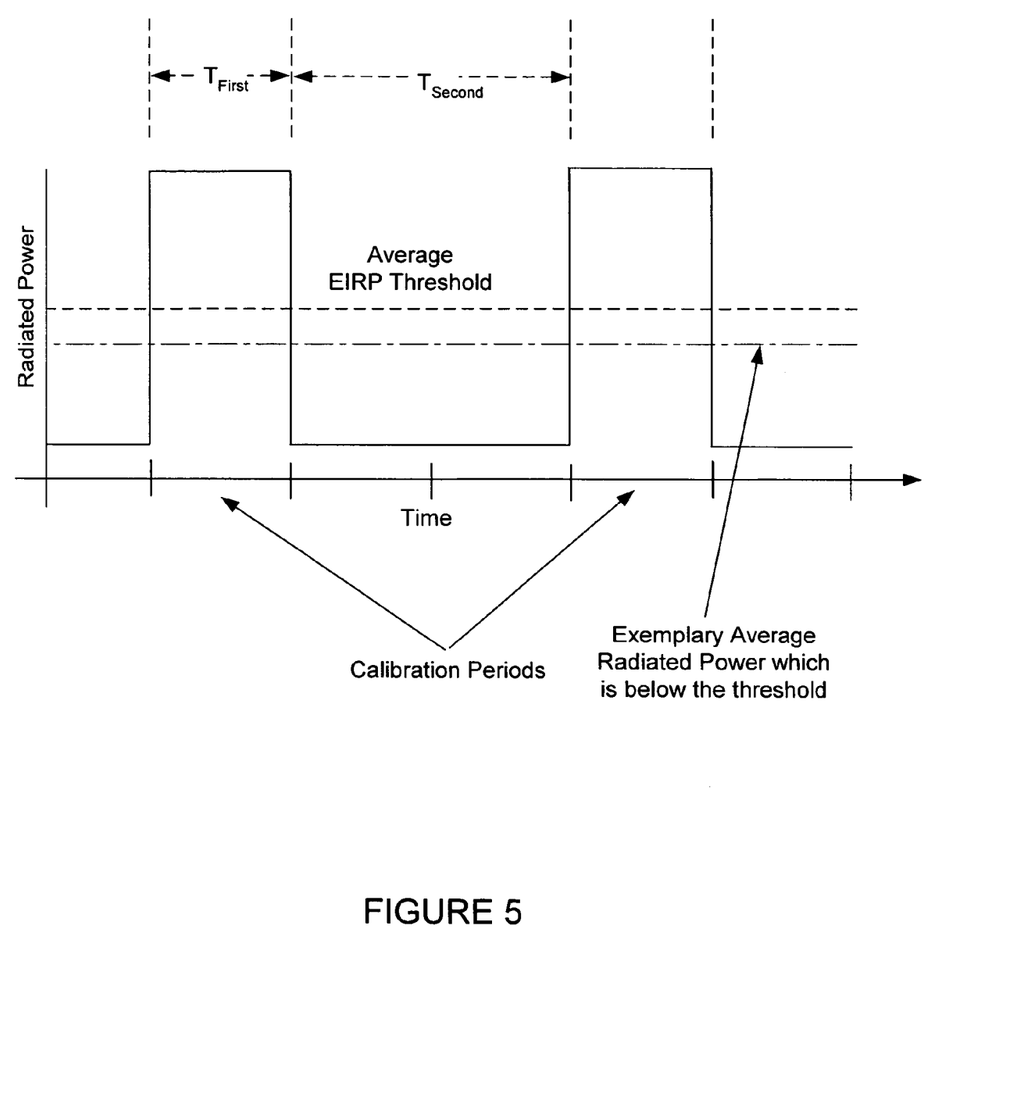
FIG. 5 is a plot that shows an exemplary average power out of a transmitter during calibration periods of the transmitter.

FIG. 5 is a plot that shows an exemplary average power out of a transmitter during calibration periods of the transmitter. As previously stated, the calibration routines of the transmitter occur during the first periods of the attenuation control signal, which correspond with the high periods of output power. An average power level (depicted by Average EIRP Threshold) upper limit can be maintained at the output of the transmitter by adjusting the duty cycle of the attenuation control signal.

As previously described, the attenuation control signal does not have to be a pulsed signal. The attenuation control signal controls the output control signals to maintain the average output power. The pulsed waveform of FIG. 5 is exemplary. The control signal can, for example, be a sine wave, or any other periodic, or even non-periodic waveform. An embodiment include maintaining the average power below the predetermined threshold by adaptively adjusting the duty cycle based upon measurement of power of the transmitter output signals. The adaptive adjustments can be made because the control logic received real time updates on the output signal.

As shown in FIG. 5, the calibration periods occur during the portions of control signal in which the attenuation is the least. This is to provide the transmitter chain with loading the most like when the transmitter is transmitting output signals.

Figure 6:
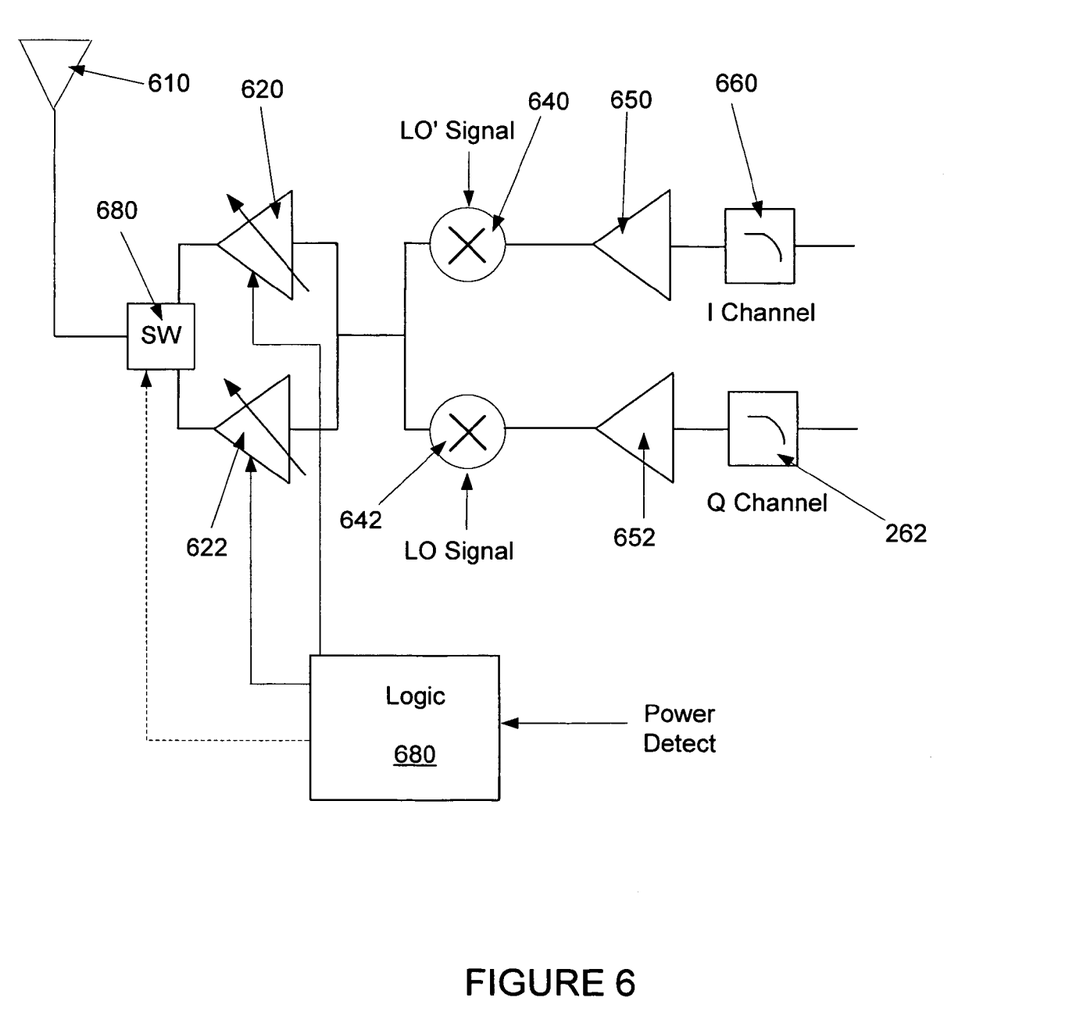
FIG. 6 shows an exemplary transmitter that includes attenuation control of transmitter I and Q output signals during calibration of the transmitter.

FIG. 6 shows an exemplary transmitter that includes attenuation control of transmitter I and Q output signals during calibration of the transmitter. The I-channel includes an I-filter 660, and an amplifier 650. The I-channel includes a frequency up-converter 640 that is driven by an LO' signal. The I-channel can include an adjustable gain amplifier 620.

The Q-channel includes an Q-filter 662, and an amplifier 652. The Q-channel includes a frequency up-converter 642 that is driven by an LO signal. The Q-channel can include an adjustable gain amplifier 622.

An output switch 680 can include three states. A first state connects the I-channel to the output, a second state connects the Q-channel to the output, a third state disconnects both the I-channel and the Q-channel from the output.

The attenuation control signal of the logic 680 can control the adjustable gain amplifier 620, the adjustable gain amplifier 622 or the output switch 680. The logic controls the output signals ensuring that the average output power is less than the predetermined threshold.

The exemplary embodiment of FIG. 6 includes two adjustable gain (attenuation) amplifiers 620, 622. The two adjustable amplifiers can be implemented with a single amplifier.

Figure 7:
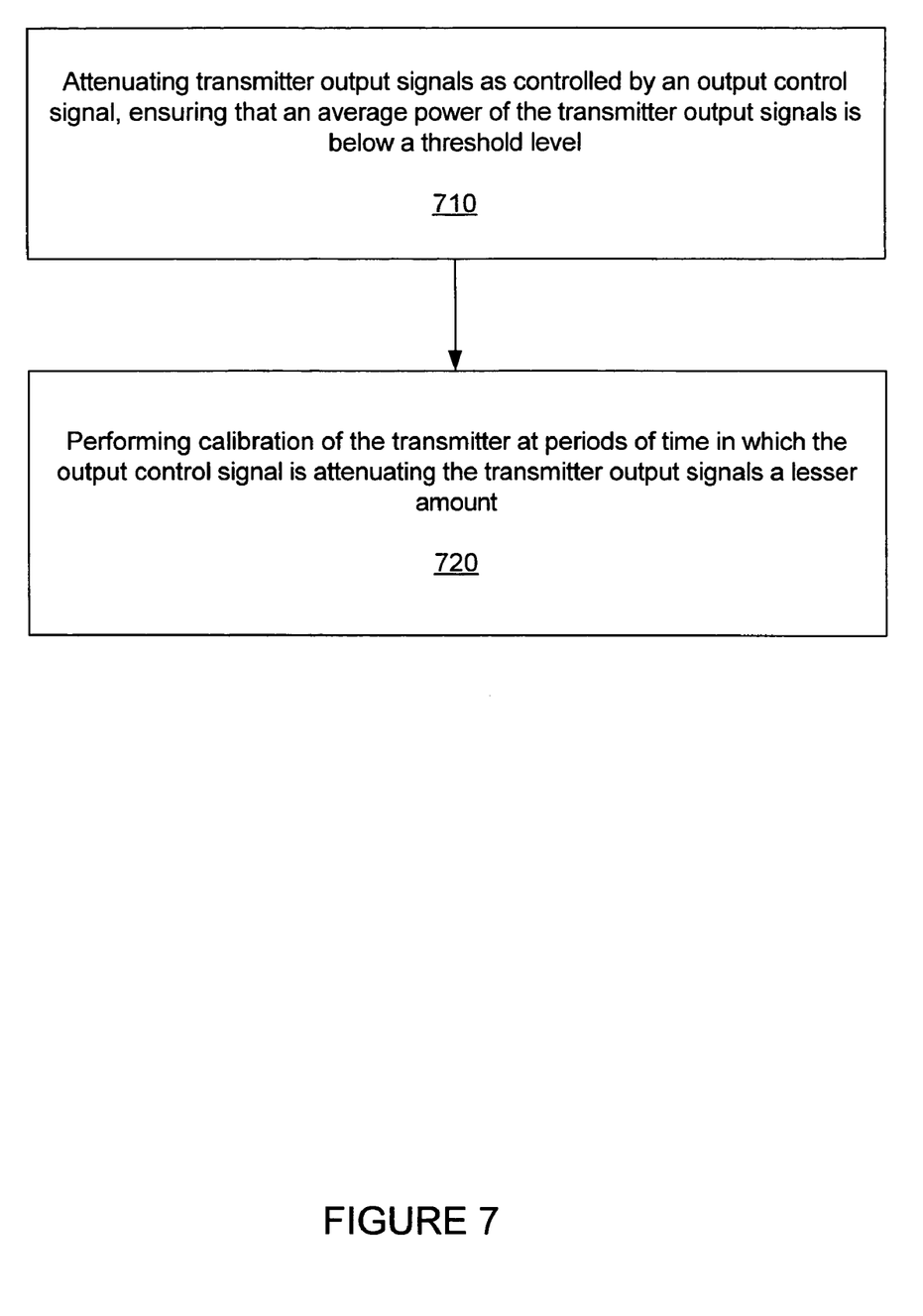
FIG. 7 is a flow chart showing exemplary steps of a method of controlling attenuation of output signals of a transmitter to allow calibration of the transmitter and maintaining signal power out below a predetermined threshold.

FIG. 7 is a flow chart showing exemplary steps of a method of controlling attenuation of output signals of a transmitter to allow calibration of the transmitter and maintaining signal power out below a predetermined threshold. A first step 710 includes attenuating transmitter output signals as controlled by an output control signal, ensuring that an average power of the transmitter output signals is below a threshold level. A second step 720 includes performing calibration of the transmitter at periods of time in which the output control signal is attenuating the transmitter output signals a lesser amount. One exemplary embodiment includes the lesser amount being an amount less than an average of a minimum amount of attenuation and a maximum amount of attenuation.

Another exemplary embodiment includes attenuating transmitter output signals as controlled by first portions and second portions of the output control signal, the first portions providing attenuation less than the average amount of attenuation, the second portions providing greater than the average amount of attenuation, and performing calibration of the transmitter during the first portions of the output control signal.

A duty cycle of the first and second portions of the control signal can be set to ensure that an average power of the transmitter output signals is maintained below the threshold level. One exemplary threshold is determined from FCC regulations on UWB average transmission power.

The output signal power can be constantly monitored, allowing the average power to be maintained below the predetermined threshold by adaptively adjusting the duty cycle of the output control signal based upon measurement of power of the transmitter output signals.

The output signals can be attenuated by turning off a transmitter chain power amplifier during the second portion of the output control signal, or by disconnecting at least one transmitter from its antenna connection during the second portion of the output control signal.

The transmitter calibration occurs during the first portions of the attenuation (output) control signal. Exemplary transmitter calibrations include an LO feed through calibration, which includes adjusting a D.C. potential input to an LO mixer and monitoring the LO feed through. The LO feed through can be monitored by power detecting transmitter output signals. The power detection can include frequency down-converting transmitter output signals with a down conversion chain of a receiver, and sampling the frequency down-converted signal.

Other exemplary transmitter calibrations include calibrating a voltage controlled oscillator (VCO), or generating test signals which are used to calibrate an associated receiver.

Although specific embodiments of the invention have been described and illustrated, the invention is not to be limited to the specific forms or arrangements of parts so described and illustrated. The invention is limited only by the appended claims.

What is claimed:

1. A method of calibrating a transmitter comprising:
attenuating transmitter output signals as controlled by an output control signal, ensuring that an average power of the transmitter output signals is below a threshold level;
performing calibration of the transmitter at periods of time in which the output control signal is attenuating the transmitter output signals a lesser amount, wherein the lesser amount is less than an average of a minimum amount of attenuation and a maximum amount of attenuation;
attenuating transmitter output signals as controlled by first portions and second portions of the output control signal, the first portions providing attenuation less than the average amount of attenuation, the second portions providing greater than the average amount of attenuation;
performing calibration of the transmitter during the first portions of the output control signal.

2. The method of claim 1, wherein a duty cycle of the first and second portions of the control signal is set to ensure that an average power of the transmitter output signals is maintained below the threshold level.

3. The method of claim 2, wherein the threshold level is determined from FCC regulations on UWB average transmission power.

4. The method of claim 2, wherein attenuating transmitter output signals comprises reducing a transmitter chain gain during the second portion of the output control signal.

5. The method of claim 4, wherein reducing a transmitter chain gain comprises turning off a transmitter chain power amplifier during the second portion of the output control signal.

6. The method of claim 2, wherein the average power is maintained below the predetermined threshold by adaptively adjusting the duty cycle based upon measurement of power of the transmitter output signals.

7. The method of claim 1, wherein attenuating transmitter output signals comprises disconnecting at least one transmitter antenna during the second portion of the output control signal.

8. The method of claim 1, wherein performing a calibration comprises an LO feed through calibration comprising adjusting a D.C. potential input to an LO mixer and monitoring the LO feed through.

9. The method of claim 8, wherein monitoring the LO feed through comprises power detecting transmitter output signals.

10. The method of claim 1, wherein performing a calibration comprising calibrating an LO VCO.

11. The method of claim 1, wherein performing a calibration comprising generating test signals which are used to calibrate an associated receiver.

12. The method of claim 1, wherein the output signals are attenuated by attenuating an LO signal that drives a frequency converter of the transmitter.

13. A method of calibrating a transmitter comprising:
attenuating transmitter output signals as controlled by an output control signal, ensuring that an average power of the transmitter output signals is below a threshold level;
performing calibration of the transmitter at periods of time in which the output control signal is attenuating the transmitter output signals a lesser amount; wherein performing a calibration comprises an LO feed through calibration comprising adjusting a D.C. potential input to an LO mixer and monitoring the LO feed through; and
wherein monitoring the LO feed through comprises frequency down-converting transmitter output signals with a down conversion chain of a receiver, and sampling the frequency down-converted signal.

14. A transmitter, comprising:
a frequency up-converting LO mixer for frequency upconverting baseband signals, generating transmitter output signals;
a transmitter antenna for transmitting the transmitter output signals;
control circuitry for controlling attenuating the transmitter output signals during a calibration of the transmitter; wherein
a duty cycle of first and second portions of the control signal is set to ensure that an average power of the transmitter signals is maintained below a threshold level.

15. The transmitter of claim 14, wherein the transmitter calibration is an LO feed through calibration.

16. The transmitter of claim 15, further comprising a frequency down converter chain for frequency down converting the transmitter output signals, allowing the LO feed through to be monitored by sampling the frequency down converted transmission output signals.

17. The transmitter of claim 15, wherein the calibration comprises an LO feed through calibration comprising adjusting a D.C. potential input to an LO mixer and monitoring the LO feed through.

18. The transmitter of claim 14, wherein the threshold level is determined from FCC regulations on UWB average transmission power.

19. The transmitter of claim 14, wherein attenuating the transmitter output signals of the transmitter signals comprises turning off a transmitter chain power amplifier during the second portion of the output control signal.

20. The transmitter of claim 14, wherein performing the calibration comprising generating test signals which are used to calibrate an associated receiver.

* * * * *